R. M. BURNS.
PIE PAN COVER.
APPLICATION FILED OCT. 23, 1914.

1,251,860. Patented Jan. 1, 1918.

Witnesses
Garroll Dailey.
Wade Koontz

Inventor
Rosanna M. Burns,
By Richard B. Owen.
Attorney

UNITED STATES PATENT OFFICE.

ROSANNA M. BURNS, OF MANITOWOC, WISCONSIN.

PIE-PAN COVER.

1,251,860.  Specification of Letters Patent.  Patented Jan. 1, 1918.

Application filed October 23, 1914. Serial No. 868,259.

*To all whom it may concern:*

Be it known that I, Mrs. ROSANNA M. BURNS, a citizen of the United States, residing at Manitowoc, in the county of Manitowoc and State of Wisconsin, have invented certain new and useful Improvements in Pie-Pan Covers, of which the following is a specification.

This invention relates to cooking utensils, and the object of the same resides in the provision of a device to be used on pie pans when a pie is being baked.

It is a well known fact that in baking pies, especially when the filling consists of fruit and the like, the juice from the fruit in the body of the pie frequently is forced out between the upper and lower crusts, and to obviate this, the upper crust is usually provided with openings to allow for the steam to escape, but the said openings very quickly become closed and therefore fail to accomplish the desired result.

The openings in the upper crust being closed, there is no means for the escape of steam, and thus the juice of the filling of the pie being cooked will be forced out of the body thereof and necessarily burn on the pie pan or on the walls of the oven; if, however, the juice cannot be forced out the pie will not be baked properly.

More specifically, the object of this invention is to provide a cover for a pie having means whereby the steam in the body of the pie is efficiently conveyed therefrom and also to make provision whereby the steam between the cover and the upper crust of the pie can be removed, and thus obviate any likelihood of the juice in the pie from being forced out of the body of the same.

A still further object of this invention is the production of a device of the kind above described, that is, simple in construction, efficient in operation, consists of the minimum number of parts and therefore can be manufactured for the minimum amount.

With these and other objects in view, this invention consists of certain novel constructions, combinations and arrangement of parts, as will be hereinafter fully described and claimed.

In the accompanying drawings:—

Figure 1:
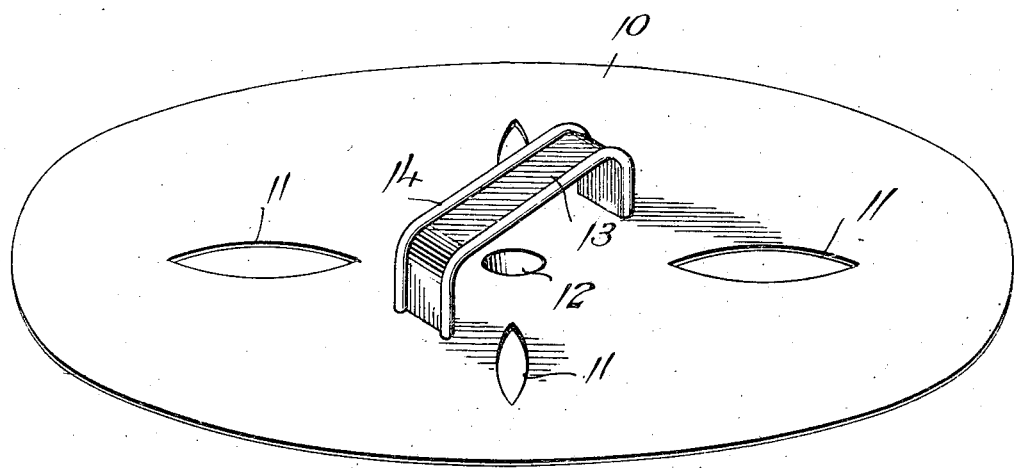
Figure 1 is a perspective view of the improved pie pan cover.
Figure 2:
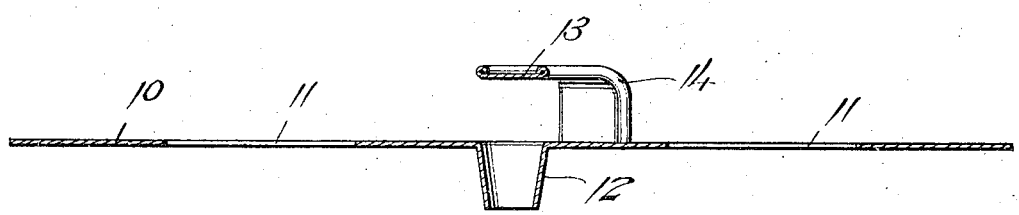
Fig. 2 is a section through the device.

Referring to the parts by reference numerals, this device comprises essentially a circular body 10, the same being made of any desired size so as to fit any desired size of pie pan, and provided in this body 10 there is a plurality of openings 11. Formed centrally and extending therefrom, is a tapering vent thimble 12, this thimble being preferably made integrally with the body 10 so as to provide a device that consists of the minimum number of parts. Means is provided with this device whereby the same can be handled readily and placed upon or removed from a pie pan in a very easy manner. The same comprises a substantially inverted U-shaped handle 13 that at its edges is rolled as at 14 so as to provide a rounded surface and thus producing an efficient gripping means.

The device when in use is placed upon a pie pan, it being of course understood that the pie ready to be baked is in the pan, and an opening is formed in the upper crust of the pie centrally thereof, and the vent thimble 12 engages in this opening and the circular body 10 is necessarily spaced from the upper crusts of the pie. As the pie is baked, the steam therein can escape from the same by means of the vent thimble 12, and if some steam lodges between the underface of the body 10 of the cover and the upper crust, the same will be efficiently conveyed therefrom by means of the openings 11 in the body 10.

What is claimed is:—

A pie pan cover comprising a body having a plurality of openings formed therein, a downwardly extending thimble struck from said body and a handle on said body as and for the purpose set forth.

In testimony whereof I affix my signature in presence of two witnesses.

Mrs. ROSANNA M. BURNS.

Witnesses:
HARRY F. KELLEY,
ADELAIDE C. KAZDA.

Copies of this patent may be obtained for five cents each, by addressing the "Commissioner of Patents, Washington, D. C."